Figure 1:
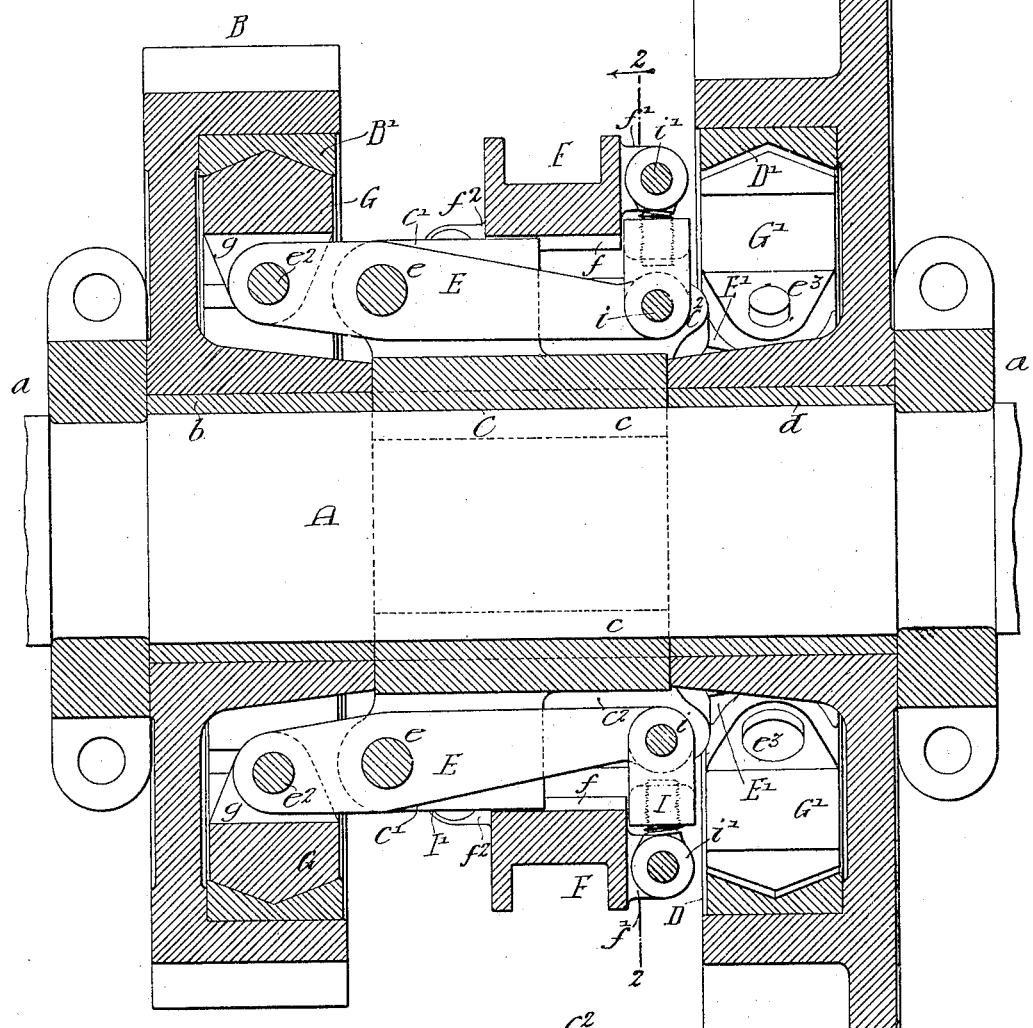

No. 813,369. PATENTED FEB. 20, 1906.
A. H. EHLE & J. H. NICE.
CLUTCH.
APPLICATION FILED JULY 22, 1905.
2 SHEETS—SHEET 2.
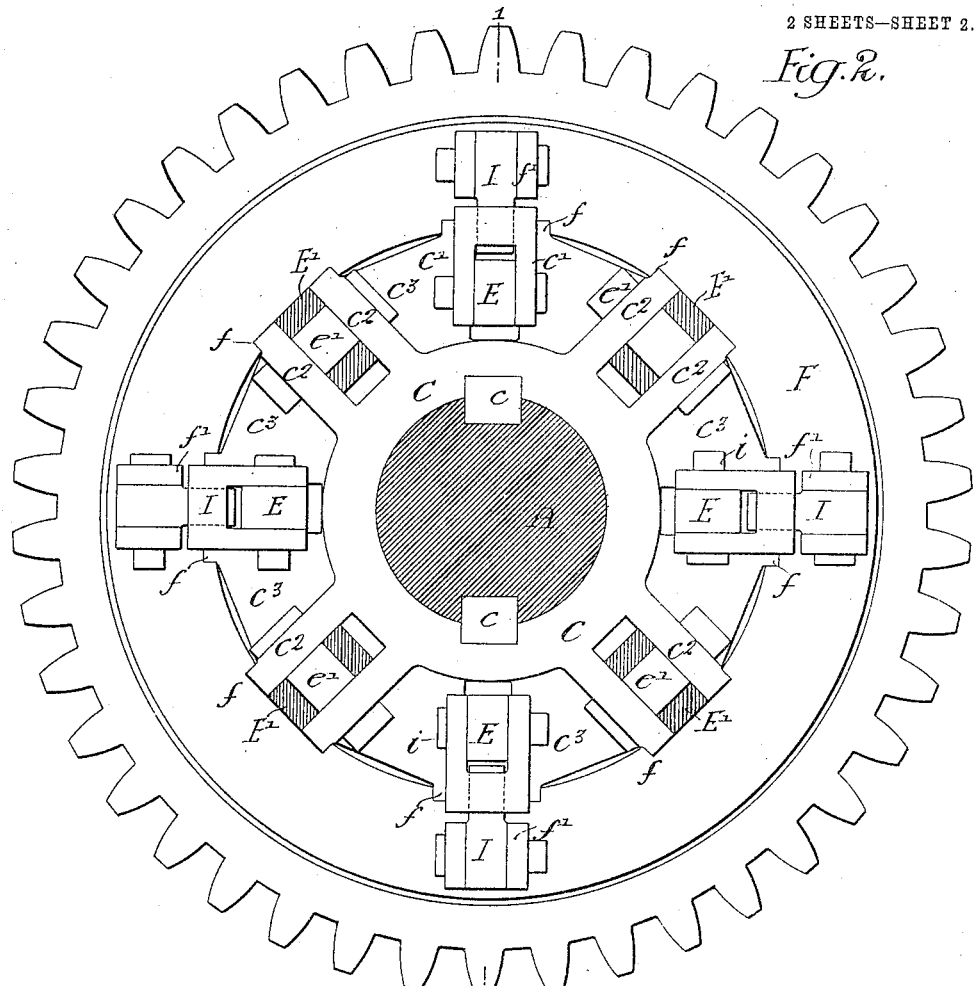
Fig. 2.
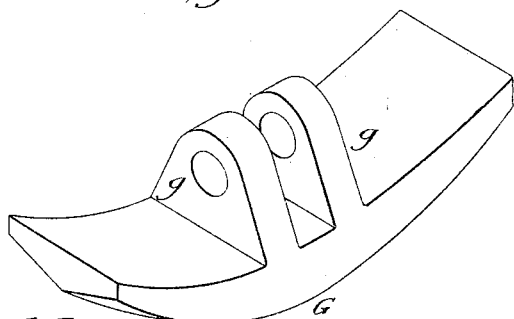
Fig. 3.
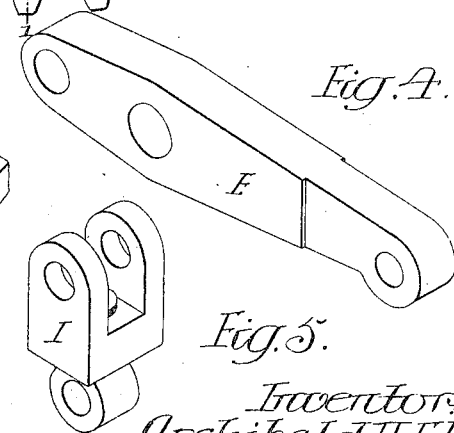
Fig. 4.
Fig. 5.
Witnesses:
Augustus B. Cripps
Walter F. Pullinger
Inventors
Archibald H. Ehle
Jesse H. Nice
by their Attorneys
Howson & Howson

UNITED STATES PATENT OFFICE.

ARCHIBALD HYDE EHLE AND JESSE H. NICE, OF PHILADELPHIA, PENNSYLVANIA, ASSIGNORS TO BURNHAM, WILLIAMS & COMPANY, OF PHILADELPHIA, PENNSYLVANIA, A FIRM.

CLUTCH.

No. 813,369.      Specification of Letters Patent.      Patented Feb. 20, 1906.

Application filed July 22, 1905. Serial No. 270,853.

*To all whom it may concern:*

Be it known that we, ARCHIBALD HYDE EHLE and JESSE H. NICE, citizens of the United States, residing in Philadelphia, Pennsylvania, have invented certain Improvements in Clutches, of which the following is a specification.

The object of our invention is to make a double friction-clutch which will be very powerful and at the same time be sufficiently compact so that it can be used in places where room is an object.

Our invention is particularly adapted for use in connection with the shifting mechanism of a motor-truck. In these trucks very little room is available for the placing of mechanism, yet the clutches must be of sufficient strength so that considerable power can be transmitted through them.

In the accompanying drawings, Figure 1 is a longitudinal section on the line 1 1, Fig. 2, illustrating our improved clutch. Fig. 2 is a section on the line 2 2, Fig. 1. Fig. 3 is a detached perspective view of one of the clutch-shoes. Fig. 4 is a detached perspective view of one of the levers. Fig. 5 is a detached perspective view of one of the links; and Fig. 6 is a side view of the fixed hub, drawn to a reduced scale.

In the present instance A is a shaft on which are loosely mounted two gear-wheels B and D. The wheels are provided with bushings $b$ and $d$, respectively.

C is a hub secured to the shaft by keys $c\ c$. This hub is mounted between the two wheels B and D, the wheels being confined against longitudinal motion by the hub and collars $a\ a$, secured to the shaft, as indicated in Fig. 1. Arranged to slide on the hub is a shifting ring F. Any suitable mechanism may be provided for shifting this ring so as to throw one or the other of these clutches into frictional contact with its wheel.

In the present instance there are two sets of levers E and E'. Each set consists of four levers, one set alternating with the other, as indicated in Fig. 2. The levers E are pivoted to lugs $c'$ on the hub C, while the levers E' are pivoted to lugs $c^2$ on the hub. It will be noticed on referring to Fig. 6 that these lugs are only one-half the length of the hub, and the lugs $c'$ are connected to the lugs $c^2$ by an annular broken web $c^3$. The upper edges of the lugs are shaped so as to enter grooves $f$ in the shifting ring F, so that while the ring can slide upon the hub C it must turn with it. Pivot-pins $e$ pass through the lugs $c'$ and through the levers E, while pins $e'$ pass through the levers E' and lugs $c^2$.

The short arm of each lever E is connected by a pivot-pin $e^2$ to lugs $g$ on a segmental shoe G. The face of this shoe is V-shaped, as shown, so as to fit the V-shaped annular groove in the ring B', secured to the wheel B. The face of the wheel B overhangs this ring, so that the ring, shoe, and the short arm of the lever are within the wheel. The long arm of the lever E passes through the shifting ring F and is attached at $i$ to a link I, which is in turn attached by a pin $i'$ to lugs $f'$ on the ring F.

The link I is made in two parts, one part having a screw-threaded opening and the other having a screw which can be adjusted in the opening to regulate the pressure of the shoe upon the ring B'.

The short arm of the lever E' is connected by a pin $e^3$ to a shoe G', similar to the shoe G, and this shoe bears upon a ring D', secured to the wheel D. The bearing-faces of the ring and the shoes are preferably V-shaped, similar to the rings and shoes of the wheel B. The long arm of each lever E' is connected by a link I' to lugs $f^2$ on the ring F, and the links I' are made adjustable in the same manner as the links I.

It will be noticed that the two sets of levers E E' are alternately arranged on the hub and each extends through the shifting ring. By this construction we are enabled to place the two wheels B and D very close together, and by making the wheels with overhanging faces, so as to inclose parts of the clutch mechanism, we almost completely protect the clutch mechanism, and the arrangement of levers is such that we obtain a very powerful double clutch.

When the parts are in the positions shown in Fig. 1, the hub C is clutched to the wheel B and locked, as the links connecting the levers to the sleeve F are in a perpendicular position and there is no end thrust on the shaft. As soon as the sleeve is moved the levers are released. When the ring F is shifted to the opposite position, the shoes G are withdrawn and the shoes G' are forced into engagement with the ring D', so as to lock the wheel D to the hub. When the ring F is in mid-position, both the clutch-shoes are out of contact and both wheels are free to rotate independently of the shaft.

We claim as our invention—

1. The combination in a clutch, of a hub, levers pivoted thereto, shoes carried by the levers, a ring with which the shoes engage, and a shifting ring connected to the levers, the said levers passing through said shifting ring, substantially as described.

2. The combination of a shaft, a ring on said shaft, a hub also on the shaft, levers pivoted to the hub, shoes carried by the short arms of the levers and arranged to bear upon said ring, a shifting ring mounted on the hub, the levers passing through the shifting ring, and a link connecting the long arm of each lever to the said shifting ring, substantially as described.

3. The combination of a shaft, a hub thereon, two wheels mounted on the shaft, each wheel having an internal friction-surface, two sets of levers pivoted to the hub, a shoe attached to the short arm of each lever arranged to bear upon the friction-surface of the respective wheels, a shifting ring mounted on the hub, the long arm of each lever passing through the shifting ring, and links attaching the ends of each long arm to the shifting ring, substantially as described.

4. The combination of a shaft, two loose wheels mounted on the shaft, a hub fixed to the shaft and mounted between the two wheels, two sets of levers pivoted to the said hub, a shoe carried by the short arm of each lever, a shifting ring common to all the levers and connected to the long arm of each lever, one set of shoes engaging with one of the wheels, the other set of shoes engaging with the other wheel, the said levers being so arranged that they pass through the shifting ring, substantially as described.

5. The combination of a shaft, two gear-wheels mounted on the shaft, a hub secured to the shaft and mounted between the two wheels, collars on the shaft holding said wheels in position, each wheel having a V-shaped friction-surface, two sets of levers, one set being pivoted to one end of the hub, the other set being pivoted to the other end of the hub and alternating with the first set, a shifting ring arranged to slide on the hub and over the levers, a link connecting the long arm of each lever to the ring, and a shoe carried by the other arm of each lever and arranged to engage the frictional surfaces of the wheels, substantially as described.

6. The combination of a shaft, two wheels loose on the shaft, a hub mounted between the wheels and secured to the shaft, an annular friction-ring secured to each wheel and having a V-shaped friction-surface, two sets of levers, one set of levers being pivoted to one end of the hub, the other set of levers being pivoted to the other end of the hub and alternating with the first set of levers, a shifting ring arranged to slide on the hub, adjustable links connecting the shifting ring to the long arms of each lever, and a segmental shoe pivoted to the short arm of each lever and having a V-shaped surface corresponding to the friction-surface of the friction-rings, substantially as described.

In testimony whereof we have signed our names to this specification in the presence of two subscribing witnesses.

ARCHIBALD HYDE EHLE.
JESSE H. NICE.

Witnesses:
E. R. LOUGHERY,
JOS. H. KLEIN.